US009315968B2

(12) United States Patent
Shang et al.

(10) Patent No.: US 9,315,968 B2
(45) Date of Patent: Apr. 19, 2016

(54) HYDRAULIC CONTROL SYSTEM FOR MACHINE

(71) Applicant: Caterpillar Inc., Peoria, IL (US)

(72) Inventors: Tonglin Shang, Bolingbrook, IL (US); Dayao Chen, Bolingbrook, IL (US)

(73) Assignee: Caterpillar Inc., Peoria, IL (US)

(*) Notice: Subject to any disclaimer, the term of this patent is extended or adjusted under 35 U.S.C. 154(b) by 396 days.

(21) Appl. No.: 14/028,618

(22) Filed: Sep. 17, 2013

(65) Prior Publication Data

US 2015/0075147 A1 Mar. 19, 2015

(51) Int. Cl.

*F16D 31/02* (2006.01)
*E02F 9/12* (2006.01)
*E02F 3/43* (2006.01)
*E02F 9/22* (2006.01)
*F15B 21/08* (2006.01)

(52) U.S. Cl.

CPC ................ *E02F 9/123* (2013.01); *E02F 3/435* (2013.01); *E02F 9/2217* (2013.01); *E02F 9/2235* (2013.01); *E02F 9/2296* (2013.01); *F15B 21/08* (2013.01)

(58) Field of Classification Search

CPC ........ F15B 21/08; E02F 9/123; E02F 9/2235; E02F 9/2217
USPC ........................................................... 60/398
See application file for complete search history.

(56) References Cited

U.S. PATENT DOCUMENTS

| | | | |
|---|---|---|---|
| 6,349,543 | B1 | 2/2002 | Lisniansky |
| 7,905,089 | B2 | 3/2011 | Ma et al. |
| 7,908,852 | B2 | 3/2011 | Zhang et al. |
| 8,269,360 | B2 | 9/2012 | Boisvert et al. |
| 2011/0020146 | A1 | 1/2011 | Akiyama et al. |
| 2012/0090309 | A1 | 4/2012 | Kim |
| 2012/0240566 | A1 | 9/2012 | Ohtsuka et al. |
| 2013/0139678 | A1 | 6/2013 | Ishikawa et al. |

FOREIGN PATENT DOCUMENTS

| | | |
|---|---|---|
| EP | 1319763 | 6/2003 |
| EP | 2341191 | 7/2011 |
| WO | 20100090555 | 8/2010 |

*Primary Examiner* — Edward Look
*Assistant Examiner* — Daniel Collins

(57) ABSTRACT

A hydraulic control system for a machine is disclosed. The hydraulic control system includes a pump configured to pressurize a fluid, and a swing motor selectively driven by pressurized fluid from the pump. The swing motor is configured to move a part of the machine. The hydraulic control system also includes a controller in communication with the pump. The controller is configured to receive an input indicative of a difference between a desired speed and an actual speed of the swing motor, and determine if the swing motor is accelerating, decelerating, or operating at neutral mode. The controller is configured to determine an amount of return fluid from an actuator of the machine that is available as makeup fluid for the swing motor if the swing motor is operating at neutral mode. The controller is configured to control the pump based on at least the amount of return fluid.

20 Claims, 6 Drawing Sheets

HYDRAULIC CONTROL SYSTEM FOR MACHINE

TECHNICAL FIELD

The present disclosure relates generally to a hydraulic control system and, more particularly, to a hydraulic control system for a machine.

BACKGROUND

Swing-type excavation machines, for example hydraulic excavators and front shovels, require significant hydraulic pressure and flow to transfer material from a dig location to a dump location. These machines direct the high-pressure fluid from an engine-driven pump through a swing motor to accelerate a loaded work tool at the start of each swing, and then restrict the flow of fluid exiting the motor at the end of each swing to slow and stop swinging of the work tool.

In order to improve the efficiency of this type of hydraulic arrangement, one or more accumulators are provided in fluid communication with the swing motor. Based on an operating state of the swing motor, the accumulators are charged or discharged. For example, the accumulators may be discharged to assist an acceleration of the swing motor. Further, the accumulators may be charged by fluid exiting the swing motor during a deceleration of the swing motor.

However, charging of the accumulators by fluid from the swing motor may reduce fluid pressure at an input port of the swing motor. This may result in cavitation, thereby damaging the swing motor and adjoining components.

U.S. Patent Publication 2011/0020146 discloses a variable displacement hydraulic pump supplying pressure oil to a hydraulic actuator, a pressure detector detecting a pump discharge pressure from the hydraulic pump, a control valve controlling a supply of the pressure oil to the hydraulic actuator, a controller controlling a pump displacement of the hydraulic pump, a hydraulic motor rotating an upper structure of the construction machine, a swing relief valve defining a relief pressure of the hydraulic motor, and a control lever switching a control valve for the hydraulic motor. The controller includes: an adjuster that, when a pump discharge pressure detected by the pressure detector exceeds a first set value, conducts an adjustment to reduce the pump displacement; and a canceller that cancels the adjustment when the pump discharge pressure falls below a second set value. The second set value is equal to or larger than the first set value.

SUMMARY

One aspect of the present disclosure is directed to a hydraulic control system. The hydraulic control system includes a pump configured to pressurize a fluid, and a swing motor selectively driven by pressurized fluid from the pump. The swing motor is configured to move a part of a machine. The hydraulic control system also includes a controller in communication with the pump. The controller is configured to receive an input indicative of a difference between a desired speed and an actual speed of the swing motor, and determine if the swing motor is accelerating, decelerating, or operating at neutral mode based on the difference between the desired and actual speeds. The controller is also configured to determine an amount of return fluid from an actuator of the machine that is available as makeup fluid for the swing motor if the swing motor is operating at neutral mode. The controller is further configured to receive an input indicative of a swing speed of the part of the machine, and control the pump based on at least the swing speed and the amount of return fluid.

Another aspect of the present disclosure is directed to a method of operating a hydraulic control system. The method includes pressurizing a fluid with a pump and selectively directing the pressurized fluid from the pump to a swing motor to move a part of a machine. The method also includes receiving an input indicative of a difference between a desired speed and an actual speed of the swing motor. The method also includes determining of the swing motor is accelerating, decelerating, or operating at neutral mode. The method further includes determining an amount of return fluid from an actuator of the machine that is available as makeup fluid for the swing motor if the swing motor is operating at neutral mode, and receiving an input indicative of a swing speed of the part of the machine. The method also includes controlling the pump based on at least the swing speed and the amount of return fluid.

DETAILED DESCRIPTION

Figure 1:
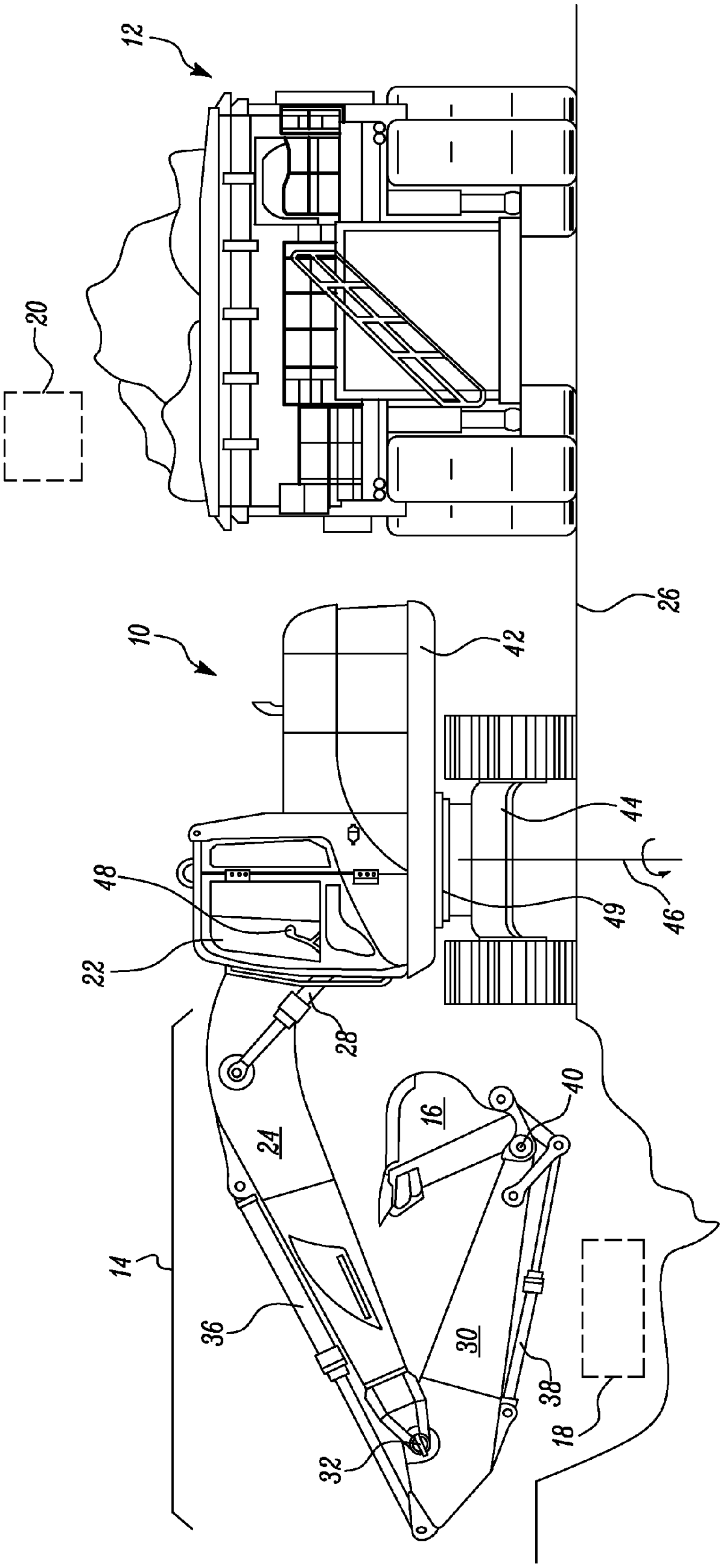
FIG. 1 is a diagrammatic illustration of an exemplary disclosed machine operating at a worksite with a haul vehicle.

FIG. 1 illustrates an exemplary machine 10 having multiple systems and components that cooperate to excavate and load earthen material onto a nearby haul vehicle 12. In the depicted example, the machine 10 is a hydraulic excavator. It is contemplated, however, that the machine 10 could alternatively embody another swing-type excavation or material handling machine, such as a backhoe, a front shovel, a dragline excavator, or another similar machine. The machine 10 may include, among other things, an implement system 14 configured to move a work tool 16 between a dig location 18 within a trench or at a pile, and a dump location 20, for example over the haul vehicle 12. The machine 10 may also include an operator station 22 for manual control of the implement system 14. It is contemplated that the machine 10 may perform operations other than truck loading, if desired, such as craning, trenching, and material handling.

The implement system 14 may include a linkage structure acted on by fluid actuators to move the work tool 16. Specifically, the implement system 14 may include a boom 24 that is vertically pivotal relative to a work surface 26 by a pair of adjacent, double-acting, hydraulic cylinders 28 (only one shown in FIG. 1). The implement system 14 may also include a stick 30 that is vertically pivotal about a horizontal pivot axis 32 relative to the boom 24 by a single, double-acting, hydraulic cylinder 36. The implement system 14 may further include a single, double-acting, hydraulic cylinder 38 that is operatively connected to the work tool 16 to tilt the work tool 16 vertically about a horizontal pivot axis 40 relative to the stick 30. The boom 24 may be pivotally connected to a frame 42 of the machine 10, while the frame 42 may be pivotally connected to an undercarriage member 44 and swung about a vertical axis 46 by a swing motor 49. The stick 30 may pivotally connect the work tool 16 to the boom 24 by way of pivot axes 32 and 40. It is contemplated that a greater or lesser number of fluid actuators may be included within the implement system 14 and connected in a manner other than described above, if desired.

Numerous different work tools 16 may be attachable to the single machine 10 and controllable via the operator station 22. The work tool 16 may include any device used to perform a particular task such as, for example, a bucket, a fork arrangement, a blade, a shovel, a crusher, a shear, a grapple, a grapple bucket, a magnet, or any other task-performing device known in the art. Although connected in the embodiment of FIG. 1 to lift, swing, and tilt relative to the machine 10, the work tool 16 may alternatively or additionally rotate, slide, extend, open and close, or move in another manner known in the art.

The operator station 22 may be configured to receive input from a machine operator indicative of a desired work tool movement. Specifically, the operator station 22 may include one or more operator input devices 48 embodied, for example, as single or multi-axis joysticks located proximal an operator seat (not shown). The operator input devices 48 may be proportional-type controllers configured to position and/or orient the work tool 16 by producing work tool position signals that are indicative of a desired work tool speed and/or force in a particular direction. The position signals may be used to actuate any one or more of the hydraulic cylinders 28, 36, 38 and/or the swing motor 49. It is contemplated that different input devices may alternatively or additionally be included within the operator station 22 such as, for example, wheels, knobs, push-pull devices, switches, pedals, and other operator input devices known in the art.

Figure 2:
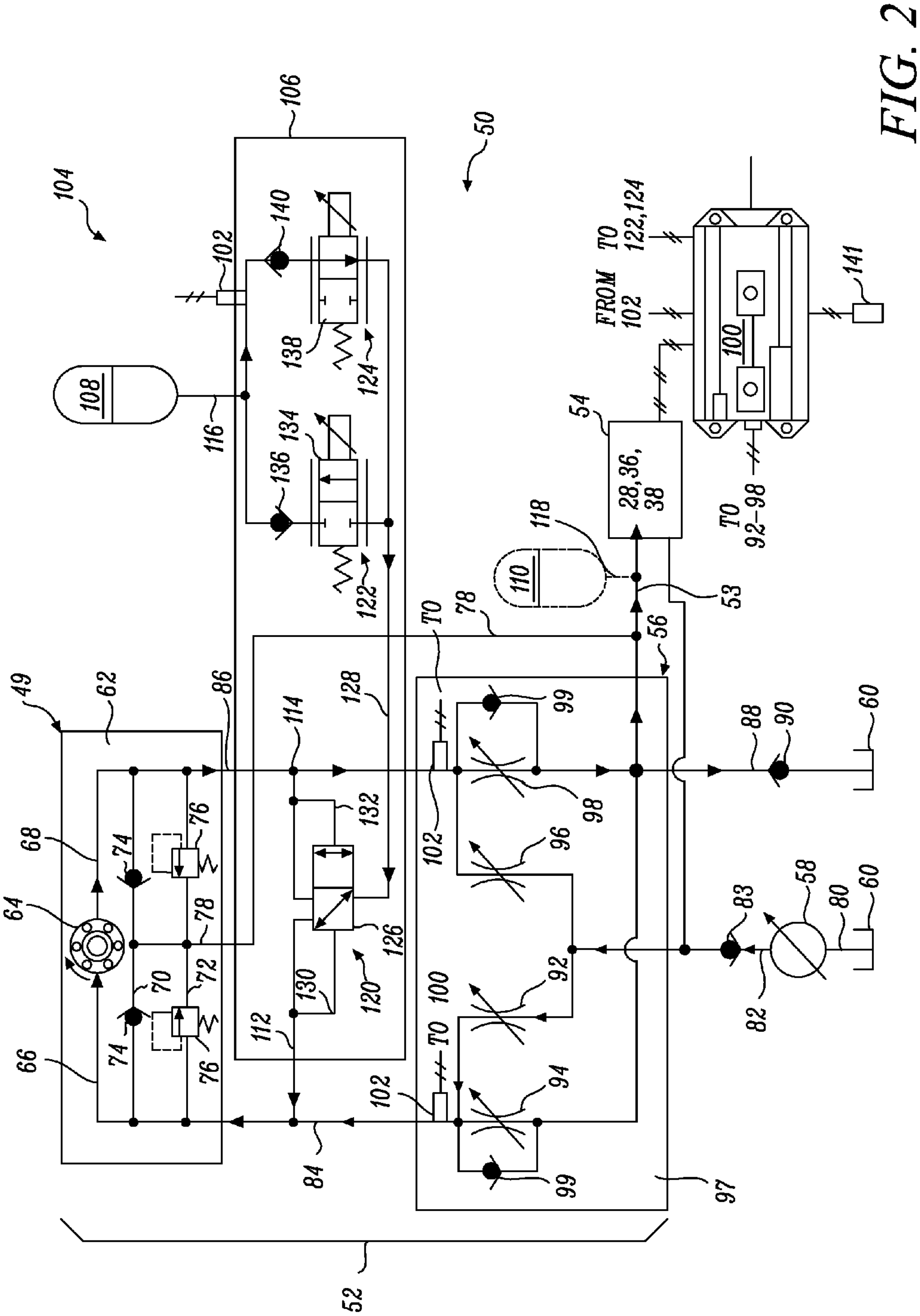
FIG. 2 is a schematic illustration of an exemplary disclosed hydraulic control system that may be used with the machine of FIG. 1.

As illustrated in FIG. 2, the machine 10 may include a hydraulic control system 50 having a plurality of fluid components that cooperate to move the implement system 14 (referring to FIG. 1). In particular, the hydraulic control system 50 may include a first circuit 52 associated with the swing motor 49, and at least a second circuit 54 associated with the hydraulic cylinders 28, 36, and 38. The first circuit 52 and the second circuit 54 may be connected to each other by a return line 53. The first circuit 52 may include, among other things, a swing control valve 56 connected to regulate a flow of pressurized fluid from a pump 58 to the swing motor 49 and from the swing motor 49 to a low-pressure tank 60 to cause a swinging movement of the work tool 16 about the vertical axis 46 (referring to FIG. 1) in accordance with an operator request received via the operator input device 48. The second circuit 54 may include similar control valves, for example a boom control valve (not shown), a stick control valve (not shown), a tool control valve (not shown), a travel control valve (not shown), and/or an auxiliary control valve connected in parallel to receive pressurized fluid from the pump 58 and to discharge waste fluid to the tank 60, thereby regulating the corresponding actuators (e.g., the hydraulic cylinders 28, 36, and 38).

The swing motor 49 may include a housing 62 at least partially forming a first and a second chamber (not shown) located to either side of an impeller 64. When the first chamber is connected to an output of the pump 58 (e.g., via a first chamber passage 66 formed within the housing 62) and the second chamber is connected to the tank 60 (e.g., via a second chamber passage 68 formed within the housing 62), the impeller 64 may be driven to rotate in a first direction (shown in FIG. 2). Conversely, when the first chamber is connected to the tank 60 via the first chamber passage 66 and the second chamber is connected to the pump 58 via the second chamber passage 68, the impeller 64 may be driven to rotate in an opposite direction (not shown). The flow rate of fluid through the impeller 64 may relate to a rotational speed of the swing motor 49, while a pressure differential across the impeller 64 may relate to an output torque thereof.

The swing motor 49 may include built-in makeup and relief functionality. In particular, a makeup passage 70 and a relief passage 72 may be formed within the housing 62, between the first chamber passage 66 and the second chamber passage 68. A pair of opposing check valves 74 and a pair of opposing relief valves 76 may be disposed within the makeup and relief passages 70, 72, respectively. A low-pressure passage 78 may be connected to each of the makeup and relief passages 70, 72 at locations between the check valves 74 and between the relief valves 76. Based on a pressure differential between the low-pressure passage 78 and the first and second chamber passages 66, 68, one of the check valves 74 may open to allow fluid from the low-pressure passage 78 into the lower-pressure one of the first and second chambers. Similarly, based on a pressure differential between the first and second chamber passages 66, 68 and the low-pressure passage 78, one of the relief valves 76 may open to allow fluid from the higher-pressure one of the first and second chambers into the low-pressure passage 78. A significant pressure differential may generally exist between the first and second chambers during a swinging movement of the implement system 14.

The pump 58 may be configured to draw fluid from the tank 60 via an inlet passage 80, pressurize the fluid to a desired level, and discharge the fluid to the first and second circuits 52, 54 via a discharge passage 82. A check valve 83 may be disposed within the discharge passage 82, if desired, to provide for a unidirectional flow of pressurized fluid from the pump 58 into the first and second circuits 52, 54. The pump 58 may embody, for example, a variable displacement pump (shown in FIG. 1), a fixed displacement pump, or another source known in the art. The pump 58 may be drivably connected to a power source (not shown) of the machine 10 by, for example, a countershaft (not shown), a belt (not shown), an electrical circuit (not shown), or in another suitable manner. Alternatively, the pump 58 may be indirectly connected to the power source of the machine 10 via a torque converter, a reduction gear box, an electrical circuit, or in any other suitable manner. The pump 58 may produce a stream of pressurized fluid having a pressure level and/or a flow rate determined, at least in part, by demands of the actuators within the first and second circuits 52, 54 that correspond with operator requested movements. The discharge passage 82 may be connected within the first circuit 52 to the first and second chamber passages 66, 68 via the swing control valve 56 and the first and second chamber conduits 84, 86, respectively, which extend between the swing control valve 56 and the swing motor 49.

The tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic systems within the machine 10 may draw fluid from and return fluid to the tank 60. It is contemplated that the hydraulic control system 50 may be connected to multiple separate fluid tanks or to a single tank, as desired. The tank 60 may be fluidly connected to the swing control valve 56 via a drain passage 88, and to the first and second chamber passages 66, 68 via the swing control valve 56 and the first and second chamber conduits 84, 86, respectively. The tank 60 may also be connected to the low-pressure passage 78. A check valve 90 may be disposed within the drain passage 88, if desired, to promote a unidirectional flow of fluid into the tank 60.

The swing control valve 56 may have elements that are movable to control the rotation of the swing motor 49 and corresponding swinging motion of the implement system 14. Specifically, the swing control valve 56 may include a first chamber supply element 92, a first chamber drain element 94, a second chamber supply element 96, and a second chamber drain element 98 all disposed within a common block or housing 97. The first and second chamber supply elements 92, 96 may be connected in parallel with the discharge passage 82 to regulate filling of their respective chambers with fluid from the pump 58, while the first and second chamber drain elements 94, 98 may be connected in parallel with the drain passage 88 to regulate draining of the respective chambers of fluid. A makeup valve 99, for example a check valve, may be disposed between an outlet of the first chamber drain element 94 and the first chamber conduit 84 and between an outlet of the second chamber drain element 98 and the second chamber conduit 86.

To drive the swing motor 49 to rotate in a first direction (shown in FIG. 2), the first chamber supply element 92 may be shifted to allow pressurized fluid from the pump 58 to enter the first chamber of the swing motor 49 via the discharge passage 82 and the first chamber conduit 84, while the second chamber drain element 98 may be shifted to allow fluid from the second chamber of the swing motor 49 to drain to the tank 60 via the second chamber conduit 86 and the drain passage 88. To drive the swing motor 49 to rotate in the opposite direction, the second chamber supply element 96 may be shifted to communicate the second chamber of the swing motor 49 with pressurized fluid from the pump 58, while the first chamber drain element 94 may be shifted to allow draining of fluid from the first chamber of the swing motor 49 to the tank 60. It is contemplated that both the supply and drain functions of the swing control valve 56 (i.e., of the four different supply and drain elements) may alternatively be performed by a single valve element associated with the first chamber and a single valve element associated with the second chamber, or by a single valve element associated with both the first and second chambers, if desired.

The supply and drain elements 92-98 of the swing control valve 56 may be solenoid-movable against a spring bias in response to a flow rate and/or position command issued by a controller 100. In particular, the swing motor 49 may rotate at a velocity that corresponds with the flow rate of fluid into and out of the first and second chambers and with a torque that corresponds with a pressure differential across the impeller 64. To achieve an operator-desired swing torque, a command based on an assumed or measured pressure drop may be sent to the solenoids (not shown) of the supply and drain elements 92-98 that causes them to open an amount corresponding to the necessary fluid flow rates and/or pressure differential at the swing motor 49. This command may be in the form of a flow rate command or a valve element position command that is issued by the controller 100.

The controller 100 may be in communication with the different components of the hydraulic control system 50 to regulate operations of the machine 10. For example, the controller 100 may be in communication with the elements of the swing control valve 56 in the first circuit 52 and with the elements of control valves (not shown) associated with the second circuit 54. Based on various operator input and monitored parameters, as will be described in more detail below, the controller 100 may be configured to selectively activate the different control valves in a coordinated manner to efficiently carry out operator requested movements of the implement system 14.

The controller 100 may include a memory, a secondary storage device, a clock, and one or more processors that cooperate to accomplish a task consistent with the present disclosure. Numerous commercially available microprocessors can be configured to perform the functions of the controller 100. It should be appreciated that the controller 100 could readily embody a general machine controller capable of controlling numerous other functions of the machine 10. Various known circuits may be associated with the controller 100, including signal-conditioning circuitry, communication circuitry, and other appropriate circuitry. It should also be appreciated that the controller 100 may include one or more of an application-specific integrated circuit (ASIC), a field-programmable gate array (FPGA), a computer system, and a logic circuit configured to allow the controller 100 to function in accordance with the present disclosure.

The operational parameters monitored by the controller 100, in one embodiment, may include a pressure of fluid within the first and/or second circuits 52, 54. For example, one or more pressure sensors 102 may be strategically located within the first chamber and/or second chamber conduits 84, 86 to sense a pressure of the respective passages and generate a corresponding signal indicative of the pressure directed to the controller 100. It is contemplated that any number of the pressure sensors 102 may be placed in any location within the first and/or second circuits 52, 54, as desired. It is further contemplated that other operational parameters such as, for example, speeds, temperatures, viscosities, densities, etc. may also or alternatively be monitored and used to regulate operation of the hydraulic control system 50, if desired.

The hydraulic control system 50 may be fitted with an energy recovery arrangement 104 that is in communication with at least the first circuit 52 and configured to selectively extract and recover energy from waste fluid that is discharged from the swing motor 49. The energy recovery arrangement (ERA) 104 may include, among other things, a recovery valve block (RVB) 106 that is fluidly connectable between the pump 58 and the swing motor 49, a first accumulator 108 configured to selectively communicate with the swing motor 49 via the RVB 106, and a second accumulator 110 (shown in dotted lines) also configured to selectively and directly communicate with the swing motor 49. In the disclosed embodiment, the RVB 106 may be fixedly and mechanically connectable to one or both of the swing control valve 56 and the swing motor 49, for example directly to the housing 62 and/or directly to the housing 97. The RVB 106 may include an internal first passage 112 fluidly connectable to the first chamber conduit 84, and an internal second passage 114 fluidly connectable to the second chamber conduit 86. The first accumulator 108 may be fluidly connected to the RVB 106 via a conduit 116, while the second accumulator 110 may be fluidly connectable to the low-pressure and drain passages 78 and 88, in parallel with the tank 60, via a conduit 118. The conduit 118 is connected to the return line 53.

The RVB 106 may house a selector valve 120, a charge valve 122 associated with the first accumulator 108, and a discharge valve 124 associated with the first accumulator 108 and disposed in parallel with the charge valve 122. The selector valve 120 may automatically fluidly communicate one of the first and second passages 112, 114 with the charge and discharge valves 122, 124 based on a pressure of the first and second passages 112, 114. The charge and discharge valves 122, 124 may be selectively movable in response to commands from the controller 100 to fluidly communicate the first accumulator 108 with the selector valve 120 for fluid charging and discharging purposes.

The selector valve 120 may be a pilot-operated, 2-position, 3-way valve that is automatically movable in response to fluid pressures in the first and second passages 112, 114 (i.e., in response to a fluid pressures within the first and second chambers of the swing motor 49). In particular, the selector valve 120 may include a valve element 126 that is movable from a first position (shown in FIG. 2) at which the first passage 112 is fluidly connected to the charge and discharge valves 122, 124 via an internal passage 128, toward a second position (not shown) at which the second passage 114 is fluidly connected to the charge and discharge valves 122, 124 via the passage 128. When the first passage 112 is fluidly connected to the charge and discharge valves 122, 124 via the passage 128, fluid flow through the second passage 114 may be inhibited by the selector valve 120 and vice versa. The first and second pilot passages 130, 132 may communicate fluid from the first and second passages 112, 114 to opposing ends of the valve element 126 such that a higher-pressure one of the first or second passages 112, 114 may cause the valve element 126 to move and fluidly connect the corresponding passage with the charge and discharge valves 122, 124 via the passage 128.

The charge valve 122 may be a solenoid-operated, variable position, 2-way valve that is movable in response to a command from the controller 100 to allow fluid from the passage 128 to enter the first accumulator 108. In particular, the charge valve 122 may include a valve element 134 that is movable from a first position (shown in FIG. 2) at which fluid flow from the passage 128 into the first accumulator 108 is inhibited, toward a second position (not shown) at which the passage 128 is fluidly connected to the first accumulator 108. When the valve element 134 is away from the first position (i.e., in the second position or in an intermediate position between the first and second positions) and a fluid pressure within the passage 128 exceeds a fluid pressure within the first accumulator 108, fluid from the passage 128 may fill (i.e., charge) the first accumulator 108. The valve element 134 may be spring-biased toward the first position and movable in response to a command from the controller 100 to any position between the first and second positions to thereby vary a flow rate of fluid from the passage 128 into the first accumulator 108. A check valve 136 may be disposed between the charge valve 122 and the first accumulator 108 to provide for a unidirectional flow of fluid into the first accumulator 108 via the charge valve 122.

The discharge valve 124 may be substantially identical to the charge valve 122 in composition, and movable in response to a command from the controller 100 to allow fluid from the first accumulator 108 to enter the passage 128 (i.e., to discharge). In particular, the discharge valve 124 may include a valve element 138 that is movable from a first position (not shown) at which fluid flow from the first accumulator 108 into the passage 128 is inhibited, toward a second position (shown in FIG. 2) at which the first accumulator 108 is fluidly connected to the passage 128. When the valve element 138 is away from the first position (i.e., in the second position or in an intermediate position between the first and second positions) and a fluid pressure within the first accumulator 108 exceeds a fluid pressure within the passage 128, fluid from the first accumulator 108 may flow into the passage 128. The valve element 138 may be spring-biased toward the first position and movable in response to a command from the controller 100 to any position between the first and second positions to thereby vary a flow rate of fluid from the first accumulator 108 into the passage 128. A check valve 140 may be disposed between the first accumulator 108 and the discharge valve 124 to provide for a unidirectional flow of fluid from the first accumulator 108 into the passage 128 via the discharge valve 124.

An additional pressure sensor 102 may be associated with the first accumulator 108 and configured to generate signals indicative of a pressure of fluid within the first accumulator 108, if desired. In the disclosed embodiment, the additional pressure sensor 102 may be disposed between the first accumulator 108 and the discharge valve 124. It is contemplated, however, that the additional pressure sensor 102 may alternatively be disposed between the first accumulator 108 and the charge valve 122 or directly connected to the first accumulator 108, if desired. Signals from this additional pressure sensor 102 may be directed to the controller 100 for use in regulating operation of the charge and/or discharge valves 122, 124.

The first and second accumulators 108, 110 may each embody pressure vessels filled with a compressible gas that are configured to store pressurized fluid for future use by the swing motor 49. The compressible gas may include, for example, nitrogen, argon, helium, or another appropriate compressible gas. As fluid in communication with the first and second accumulators 108, 110 exceeds predetermined pressures of the first and second accumulators 108, 110, the fluid may flow into the accumulators 108, 110. Because the gas therein is compressible, it may act like a spring and compress as the fluid flows into the first and second accumulators 108, 110. When the pressure of the fluid within conduits 116, 118 drops below the predetermined pressures of the first and second accumulators 108, 110, the compressed gas may expand and urge the fluid from within the first and second accumulators 108, 110 to exit. It is contemplated that the first and second accumulators 108, 110 may alternatively embody membrane/spring-biased or bladder types of accumulators, if desired.

In the disclosed embodiment, the first accumulator 108 may be a larger (i.e., about 5-20 times larger) and higher-pressure (i.e., about 5-60 times higher-pressure) accumulator, as compared to the second accumulator 110. Specifically, the first accumulator 108 may be configured to accumulate up to about 30-100 L of fluid having a pressure in the range of about 200-315 bar, while the second accumulator 110 may be configured to accumulate up to about 10 L of fluid having a pressure in the range of about 5-30 bar. In this configuration, the first accumulator 108 may be used primarily to assist the motion of the swing motor 49 and to improve machine efficiencies, while the second accumulator 110 may be used primarily as a makeup accumulator to help reduce a likelihood of voiding at the swing motor 49. It is contemplated, however, that other volumes and pressures may be accommodated by the first and/or second accumulators 108, 110, if desired.

The second accumulator 110 may be an optional component of the hydraulic control system 50. In an embodiment, the second accumulator 110 may have a reduced capacity. However, in various other embodiments, the second accumulator 110 may not be present.

The controller 100 may be configured to selectively cause the first accumulator 108 to charge and discharge, thereby improving performance of the machine 10. In particular, a typical swinging motion of the implement system 14 instituted by the swing motor 49 may consist of segments of time during which the swing motor 49 is accelerating a swinging movement of the implement system 14, and segments of time during which the swing motor 49 is decelerating the swinging movement of the implement system 14. The acceleration segments may require significant energy from the swing motor 49 that is conventionally realized by way of pressurized fluid supplied to the swing motor 49 by the pump 58, while the deceleration segments may produce significant energy in the form of pressurized fluid that is conventionally wasted through discharge to the tank 60. Both the acceleration and the deceleration segments may require the swing motor 49 to convert significant amounts of hydraulic energy to swing kinetic energy, and vice versa. The fluid passing through the swing motor 49 during deceleration, however, still contains a large amount of energy. The fluid passing through the swing motor 49 may be pressurized during deceleration as a result of restrictions to the flow of the fluid exiting the swing motor 49. If the fluid passing through the swing motor 49 is selectively collected within the first accumulator 108 during the deceleration segments, this energy can then be returned to (i.e., discharged) and reused by the swing motor 49 during the ensuing acceleration segments. The swing motor 49 can be assisted during the acceleration segments by selectively causing the first accumulator 108 to discharge pressurized fluid into the higher-pressure chamber of the swing motor 49 (via the discharge valve 124, the passage 128, the selector valve 120, and the appropriate one of the first and second chamber conduits 84, 86), alone or together with high-pressure fluid from the pump 58, thereby propelling the swing motor 49 at the same or greater rate with less pump power than otherwise possible via the pump 58 alone. The swing motor 49 can be assisted during the deceleration segments by selectively causing the first accumulator 108 to charge with fluid exiting the swing motor 49, thereby providing additional resistance to the motion of the swing motor 49 and lowering a restriction and cooling requirement of the fluid exiting the swing motor 49.

In an alternative embodiment, the controller 100 may be configured to selectively control charging of the first accumulator 108 with fluid exiting the pump 58, as opposed to fluid exiting the swing motor 49. That is, during a peak-shaving or economy mode of operation, the controller 100 may be configured to cause the first accumulator 108 to charge with fluid exiting the pump 58 (e.g., via the control valve 56, the appropriate one of the first and second chamber conduits 84, 86, the selector valve 120, the passage 128, and the charge valve 122) when the pump 58 has excess capacity (i.e., a capacity greater than required by the circuits 52, 54 to move the work tool 16 as requested by the operator). Then, during times when the pump 58 has insufficient capacity to adequately power the swing motor 49, the high-pressure fluid previously collected from the pump 58 within the first accumulator 108 may be discharged in the manner described above to assist the swing motor 49.

The controller 100 may be configured to regulate the charging and discharging of the first accumulator 108 based on a current or ongoing segment of the excavation, material handling, or other work cycle of the machine 10. In particular, based on input received from one or more performance sensors 141, the controller 100 may be configured to partition a typical work cycle performed by the machine 10 into a plurality of segments. A typical work cycle may be partitioned, for example, into a dig segment, a swing-to-dump acceleration segment, a swing-to-dump deceleration segment, a dump segment, a swing-to-dig acceleration segment, and a swing-to-dig deceleration segment, as will be described in more detail below. Based on the segment of the excavation work cycle currently being performed, the controller 100 may selectively cause the first accumulator 108 to charge or discharge, thereby assisting the swing motor 49 during the acceleration and deceleration segments.

One or more maps and/or dynamic elements relating signals from the sensor(s) 141 to the different segments of the excavation work cycle may be stored within the memory of the controller 100. Each of these maps may include a collection of data in the form of tables, graphs, and/or equations. The dynamic elements may include integrators, filters, rate limiters, and delay elements. In one example, threshold speeds, cylinder pressures, and/or operator input (i.e., lever position) associated with the start and/or end of one or more of the segments may be stored within the maps. In another example, threshold forces and/or actuator positions associated with the start and/or end of one or more of the segments may be stored within the maps. The controller 100 may be configured to reference the signals from the sensor(s) 141 with the maps and filters stored in memory to determine the segment of the excavation work cycle currently being executed, and then regulate the charging and discharging of the first accumulator 108 accordingly. The controller 100 may allow the operator of the machine 10 to directly modify these maps and/or to select specific maps from available relationship maps stored in the memory of the controller 100 to affect segment partitioning and accumulator control, as desired. It is contemplated that the maps may additionally or alternatively be automatically selectable based on modes of machine operation, if desired.

The sensor(s) 141 may be associated with the generally horizontal swinging motion of the work tool 16 imparted by the swing motor 49 (i.e., the motion of the frame 42 relative to the undercarriage member 44). For example, the sensor 141 may embody a rotational position or speed sensor associated with the operation of the swing motor 49, an angular position or speed sensor associated with the pivot connection between the frame 42 and the undercarriage member 44, a local or global coordinate position or speed sensor associated with any linkage member connecting the work tool 16 to the undercarriage member 44 or with the work tool 16 itself, a displacement sensor associated with movement of the operator input device 48, or any other type of sensor known in the art that may generate a signal indicative of a swing position, speed, force, or other swing-related parameter of the machine 10. The signal generated by the sensor(s) 141 may be sent to and recorded by the controller 100 during each excavation work cycle. It is contemplated that the controller 100 may derive a swing speed based on a position signal from the sensor 141 and an elapsed period of time, if desired.

Alternatively or additionally, the sensor(s) 141 may be associated with the vertical pivoting motion of the work tool 16 imparted by the hydraulic cylinders 28 (i.e., associated with the lifting and lowering motions of the boom 24 relative to the frame 42). Specifically, the sensor 141 may be an angular position or speed sensor associated with a pivot joint between the boom 24 and the frame 42, a displacement sensor associated with the hydraulic cylinders 28, a local or global coordinate position or speed sensor associated with any linkage member connecting the work tool 16 to the frame 42 or with the work tool 16 itself, a displacement sensor associated with movement of the operator input device 48, or any other type of sensor known in the art that may generate a signal indicative of a pivoting position or speed of the boom 24. It is contemplated that the controller 100 may derive a pivot speed based on a position signal from the sensor 141 and an elapsed period of time, if desired.

In yet an additional embodiment, the sensor(s) 141 may be associated with the tilting force of the work tool 16 imparted by the hydraulic cylinder 38. Specifically, the sensor 141 may be a pressure sensor associated with one or more chambers within the hydraulic cylinder 38 or any other type of sensor known in the art that may generate a signal indicative of a tilting force of the machine 10 generated during a dig and dump operation of the work tool 16.

Figure 3:
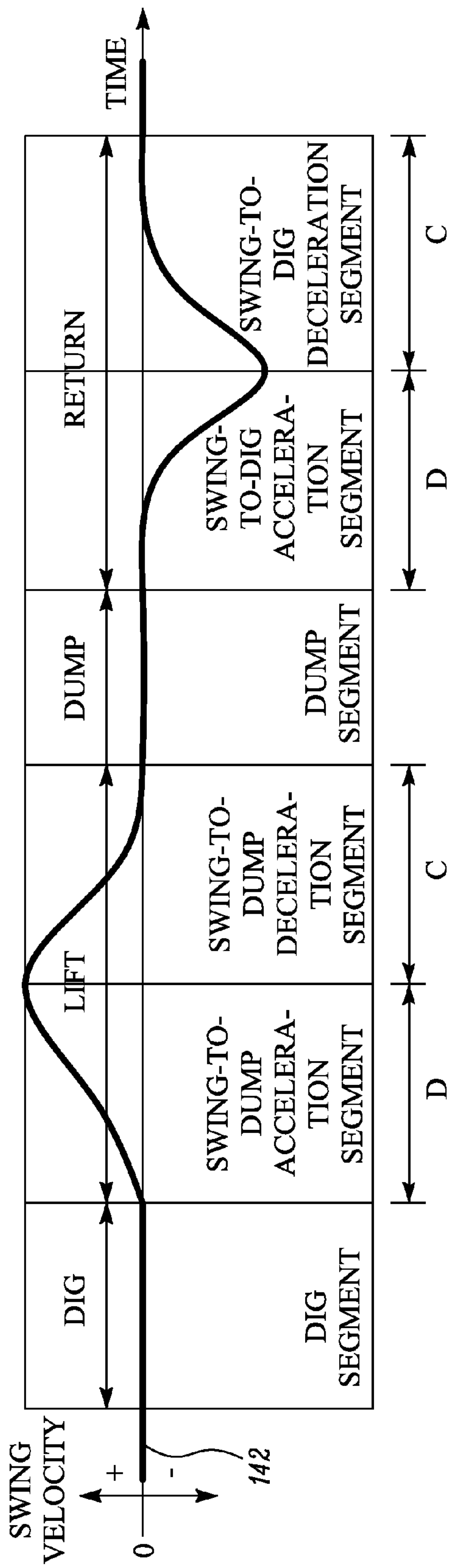
FIG. 3 is an exemplary disclosed control map that may be used by the hydraulic control system of FIG. 2.

With reference to FIG. 3, an exemplary curve 142 may represent a swing speed signal generated by the sensor(s) 141 relative to time throughout each segment of an excavation work cycle, for example throughout a work cycle associated with 90° truck loading. During most of the dig segment, the swing speed may typically be about zero (i.e., the machine 10 may generally not swing during a digging operation). At completion of a dig stroke, the machine 10 may generally be controlled to swing the work tool 16 toward the waiting haul vehicle 12 (referring to FIG. 1). As such, the swing speed of the machine 10 may begin to increase near the end of the dig segment. As the swing-to-dump segment of the excavation work cycle progresses, the swing speed may accelerate to a maximum when the work tool 16 is about midway between the dig location 18 and the dump location 20, and then decelerate toward the end of the swing-to-dump segment. During most of the dump segment, the swing speed may typically be about zero (i.e., the machine 10 may generally not swing during a dumping operation). When dumping is complete, the machine 10 may generally be controlled to swing the work tool 16 back toward the dig location 18 (referring to FIG. 1). As such, the swing speed of the machine 10 may increase near the end of the dump segment. As the swing-to-dig segment of the excavation cycle progresses, the swing speed may accelerate to a maximum in a direction opposite to the swing direction during the swing-to-dump segment of the excavation cycle. This maximum speed may generally be achieved when the work tool 16 is about midway between the dump location 20 and the dig location 18. The swing speed of the work tool 16 may then decelerate toward the end of the swing-to-dig segment, as the work tool 16 nears the dig location 18. The controller 100 may partition a current excavation work cycle into the six segments described above based on signals received from the sensor(s) 141 and the maps and filters stored in memory, based on swing speeds, tilt forces, and/or operator input recorded for a previous excavation work cycle, or in any other manner known in the art.

The controller 100 may selectively cause the first accumulator 108 to charge and to discharge based on the current or ongoing segment of the excavation work cycle. For example, FIG. 3 illustrates an indication as to when the first accumulator 108 is controlled to charge with pressurized fluid (represented by "C") or to discharge pressurized fluid (represented by "D") relative to the segments of each excavation work cycle. The first accumulator 108 can be controlled to charge with pressurized fluid by moving the valve element 134 of the charge valve 122 to the second or flow-passing position when the pressure within the passage 128 is greater than the pressure within the first accumulator 108. The first accumulator 108 can be controlled to discharge pressurized fluid by moving the valve element 138 of the discharge valve 124 to the second or flow-passing position when the pressure within the first accumulator 108 is greater than the pressure within the passage 128.

FIG. 3 illustrates an exemplary mode of operation, during which the excavation cycle may be completed. The exemplary mode of operation may correspond with a swing-intensive operation where a significant amount of swing energy is available for storage by the first accumulator 108. An exemplary swing-intensive operation may include a 150° (or greater) swing operation, such as the truck loading example shown in FIG. 1, material handling (e.g., using a grapple or magnet), hopper feeding from a nearby pile, or another operation where an operator of the machine 10 typically requests harsh stop-and-go commands. When operating in the exemplary mode, the controller 100 may be configured to cause the first accumulator 108 to discharge fluid to the swing motor 49 during the swing-to-dump acceleration segment, receive fluid from the swing motor 49 during the swing-to-dump deceleration segment, discharge fluid to the swing motor 49 during the swing-to-dig acceleration segment, and receive fluid from the swing motor 49 during the swing-to-dig deceleration segment.

The controller 100 may be instructed by the operator of the machine 10 that the exemplary mode of operation is currently in effect (e.g., that truck loading is being performed) or, alternatively, the controller 100 may automatically recognize operation in the exemplary mode based on performance of the machine 10 monitored via the sensor(s) 141. For example, the controller 100 could monitor swing angle of the implement system 14 between stopping positions (i.e., between the dig and dump locations 18, 20) and, when the swing angle is repeatedly greater than a threshold angle, for instance greater than about 150°, the controller 100 may determine that the exemplary mode of operation is in effect. In another example, manipulation of the operator input device 48 could be monitored via the sensor(s) 141 to detect "harsh" inputs indicative of the exemplary mode operation. In particular, if the input is repeatedly moved from below a low threshold (e.g., about 10% lever command) to above a high threshold level (e.g., about 100% lever command) within a short period of time (e.g., about 2 sec or less), the input device 48 may be considered to be manipulated in a harsh manner, and the controller 100 may responsively determine that the exemplary mode of operation is in effect. In a final example, the controller 100 may determine that the first mode of operation is in effect based on a cycle and/or value of pressures within the first accumulator 108, for example when a threshold pressure is repetitively reached. In this final example, the threshold pressure may be about 75% of a maximum pressure.

There may be different modes of operation (not shown) in addition to the exemplary mode illustrated in FIG. 3. For example, various modes may correspond generally with swing operations where only a limited amount of swing energy is available for storage by the first accumulator 108. Exemplary swing operations having a limited amount of energy may include 90° truck loading, 45° trenching, tamping, or slow and smooth craning. During these operations, fluid energy may need to be accumulated from two or more segments of the excavation work cycle before significant discharge of the accumulated energy is possible. There may be also partial charging or discharging during one or more segments as opposed to the exemplary mode of FIG. 3. Some modes may also correspond to economy or peak-shaving modes, where excess fluid energy during one segment of the excavation work cycle is generated by the pump 58 (fluid energy in excess of an amount required to adequately drive the swing motor 49 according to operator requests) and stored for use during another segment when less than adequate fluid energy may be available for a desired swinging operation. The exemplary mode of FIG. 3 is for illustrative purposes only. Various details of one or more segments are not shown in FIG. 3. For example, there may be a transition period between an acceleration segment (For example, the swing-to-dump acceleration segment) and a deceleration segment (For example, the swing-to-dump deceleration segment). Similarly, there may be a transition period between charging and ensuing discharging of the first accumulator 108. Further, there may be a time lag between a start of a segment, and charging or discharging of the first accumulator 108. Various such details will be explained hereinafter with reference to the swing-to-dump segment of the excavation cycle in conjunction with FIGS. 4 and 5.

Figure 4:
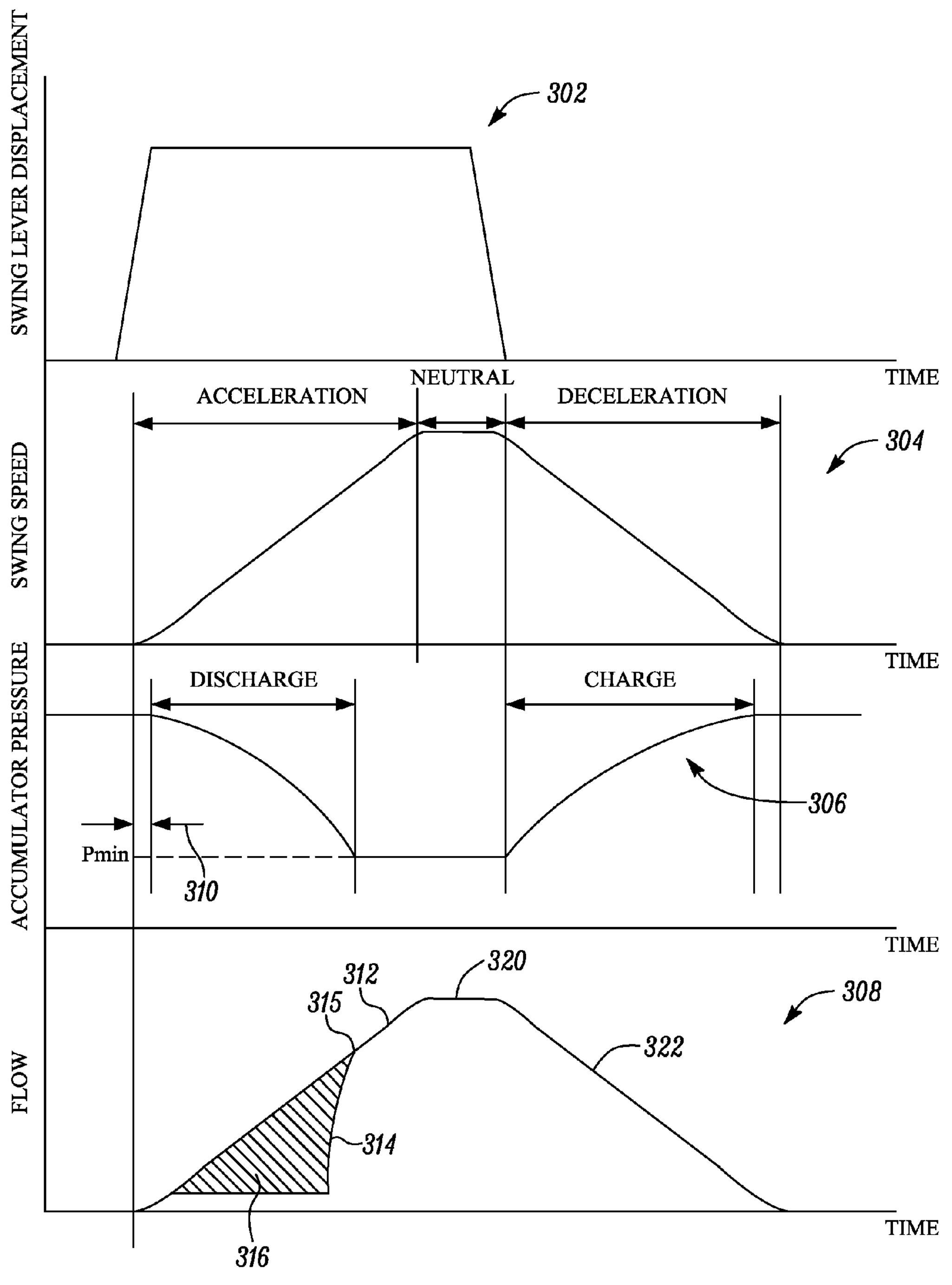
FIG. 4 is an exemplary disclosed control chart of a swing-to-dump segment that may be used by the hydraulic control system of FIG. 2.
Figure 5:
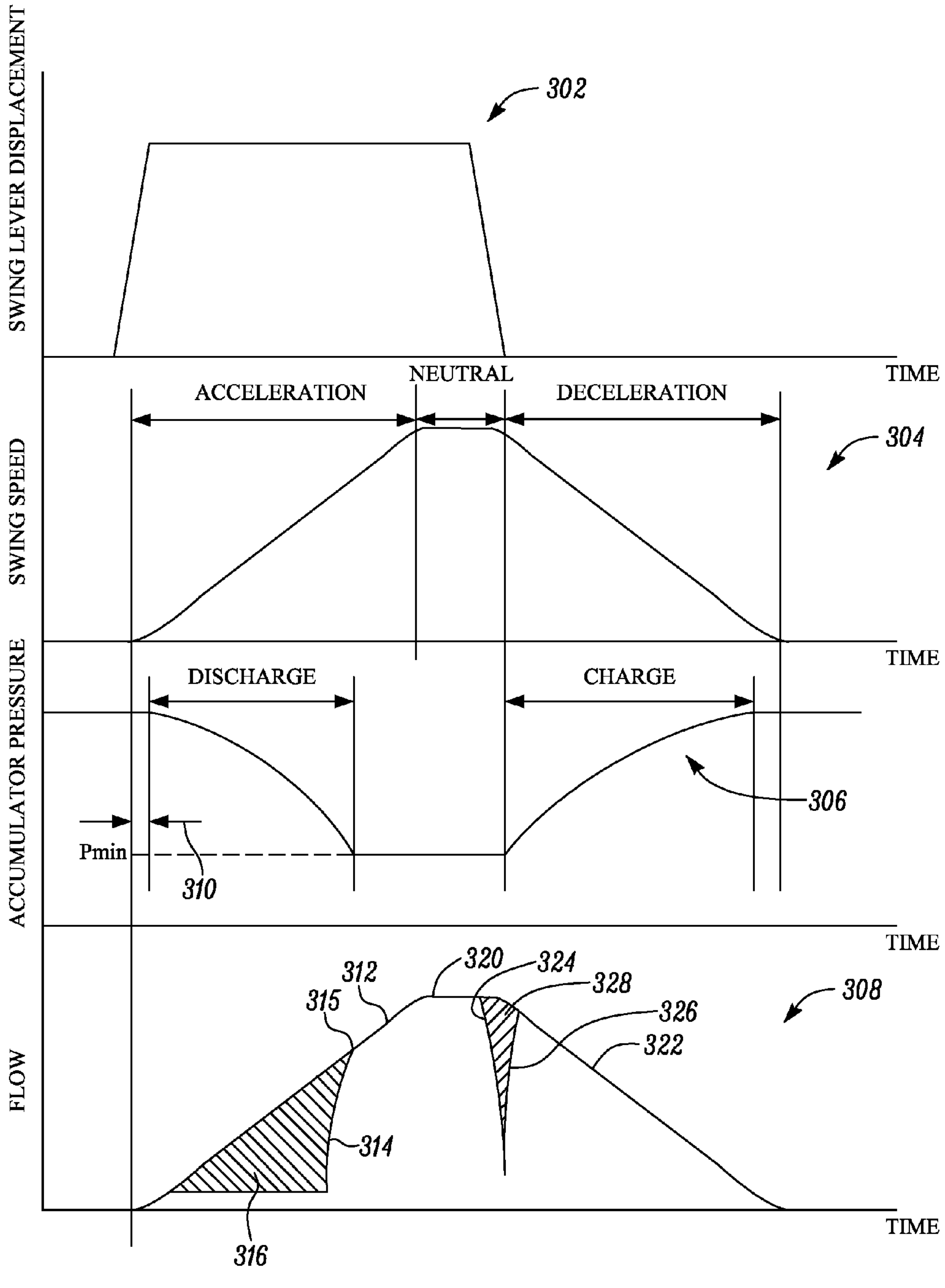
FIG. 5 is another exemplary disclosed control chart of the swing-to-dump segment that may be used by the hydraulic control system of FIG. 2.

FIGS. 4 and 5 illustrate exemplary curves of various parameters during the swing-to-dump segment of the excavation cycle. Reference may also be made to various components of the hydraulic control system 50, as illustrated in FIG. 2. A curve 302 illustrates a variation of a swing lever actuation with time. The curve 302 is therefore indicative of a variation in a displacement position of the swing lever. The swing lever may be part of the operator input device 48 (shown in FIG. 2). A curve 304 illustrates variation of the swing speed with time. Further, a curve 306 illustrates variation of accumulator pressure within the first accumulator 108. A curve 308 illustrates variation of flow associated with the swing motor 49. In particular, the curve 308 illustrates the flow in the first chamber passage 66 of the swing motor 49.

The curve 302 illustrates a rapid actuation of the swing lever from below a low threshold level (E.g., from a non-actuating level) to above a high threshold level (e.g., about 100% lever command) within a short period of time thereby initiating the swing-to-dump segment. The high threshold and the non-actuating levels of the swing lever may coincide with two displacement positions of the swing lever. Further, the swing lever may be retained at the high threshold level for a period. Consequently, the swing motor 49 accelerates to a maximum as illustrated by the curve 304. During acceleration of the swing motor 49, the first accumulator 108 (shown in FIG. 2) discharges. Consequently, a pressure within the first accumulator 108 drops as illustrated by the curve 306. A time lag 310 may be present between acceleration of the swing motor 49, and a drop in accumulator pressure. This time lag 310 may be due to the coordination between closing of the first chamber supply element 92 and the opening of the discharge valve 124, such that a small amount of constant flow provided by the pump 58 may be accommodated by a corresponding gradual increase in flow provided by the first accumulator 108. In this manner, the motion of swing motor 49 may be continuous and substantially unaffected by the switch between supply sources.

As illustrated in FIGS. 4 and 5, a first portion 312 of the curve 308 represents the flow in the first chamber passage 66. During acceleration of the swing motor 49, the flow increases to support the acceleration of the swing motor 49 in the first direction, as shown in FIG. 2. A pump flow curve 314 in the first portion 312 may represent a flow of the pump 58. As illustrated in FIGS. 4 and 5, the pump flow curve 314 may be substantially low as the pump 58 maintains a minimum flow in the first chamber passage 66. The minimum flow of the pump 58 may be determined by a minimum pump displacement setting. Instead, the flow in the first chamber passage 66 may be primarily provided by the discharging of the first accumulator 108. While supplying fluid from the first accumulator 108 to the swing motor 49, the controller 100 may monitor the pressure of fluid within the first accumulator 108 and compare the monitored pressure to a one or more pressure thresholds, as indicated by Pmin in the curve 306 (e.g., to a minimum pressure threshold during acceleration). If the pressure of fluid within the first accumulator 108 passes through the appropriate pressure threshold (e.g., when the pressure of the fluid within the first accumulator 108 reaches or falls below the minimum pressure threshold Pmin during acceleration), the controller 100 may open the first chamber supply element 92 and close the discharge valve 124. This may be a normal mode of operation wherein the pump flow is primarily used to drive the swing motor 49. Therefore, a point 315 may indicate a transition from accumulator-assisted operation to pump-assisted operation of the swing motor 49. In this situation, the capacity of the first accumulator 108 to provide fluid will have been nearly or completely exhausted, and the pump 58 should be used to continue the swinging motion of the work tool 16. The pump 58 is therefore upstroked and the pump flow consequently increases, as indicated by the pump flow curve 314, as discharging from the first accumulator 108 is terminated at the minimum pressure threshold Pmin. A shaded region 316 between the first portion 312 of the curve 308, and the pump flow curve 314 may represent an extent of accumulator assist provided by discharging of the first accumulator 108. Further, after discharging, the charge valve 122 associated the first accumulator 108 may remain closed. As a result, the first accumulator 108 may be neither charging or discharging after termination of accumulator-assisted operation, as indicated by the curve 306. Referring to the curve 304, a transition period may be provided between the acceleration segment and the deceleration segment. The transition period may coincide with a neutral segment. During the neutral segment, the swing motor 49 may be operating at a constant speed and/or at a low pressure differential across the swing motor 49. The low pressure differential may be caused during the transition period between the acceleration segment and the deceleration segment. The low pressure differential may be lower than a threshold pressure differential, which is the minimum pressure differential, across the swing motor 49, required for charging or discharging the first accumulator 108. Thus, during a neutral mode of operation, the swing motor 49 may operate at a constant speed and/or at a low pressure differential, which is lower than the threshold pressure differential. The neutral segment may provide a smooth transition between the acceleration segment and the deceleration segment. The neutral segment may start after the swing motor 49 has reached a maximum acceleration value or a change in operator lever command. During the neutral segment, the flow in the first chamber passage 66 may remain substantially constant, as indicated by a second portion 320 of the curve 308. The constant flow in the first chamber passage 66 may maintain the swing motor 49 at the constant speed. Further, the first accumulator 108 may be neither charging or discharging during the neutral segment due to the low pressure differential across the swing motor 49. Moreover, as indicated by the curve 302, the swing lever may be actuated from the high threshold level during an intermediate point in the neutral segment. Further, the neutral segment may end and the deceleration segment may start when the swing lever is actuated to the non-actuated level. In an embodiment, the controller 100 may receive input indicative of a desired speed of the swing motor 49, an actual speed of the swing motor 49, and a pressure gradient across the swing motor 49. The input indicative of the desired speed may be a signal generated by the operator input device 48 (the swing lever in FIGS. 4 and 5), while the input indicative of actual speed may be a signal generated by the performance sensor 141 associated with the swing motor 49. The input indicative of the pressure gradient across the swing motor 49 may include signals generated by the pressure sensors 102. It is contemplated that other input indicative of the desired speed, actual speed, and/or pressure gradient of the swing motor 49 may also or alternatively be utilized, if desired. The controller 100 may further determine if the swing motor 49 is accelerating, decelerating, or operating at a neutral mode. The controller 100 may then determine an amount of return flow in the return line 53 available as makeup fluid for the swing motor 49 from the second circuit 54. The controller 100 may then compare the flow rate of return fluid from the second circuit 54 to an amount of makeup fluid required by the swing motor 49 to prevent potential voiding or cavitation during subsequent deceleration of the swing motor 49.

Referring to FIG. 4, if the controller 100 determines that the return flow is insufficient to prevent potential voiding of the swing motor 49, the controller 100 determines if the swing speed is above a threshold speed. The threshold speed may be a low speed (E.g., about 2 rpm) which may coincide with a substantially zero speed during most of the dump or dig segments (shown in FIG. 3). Thus, the controller 100 may verify whether the constant speed of the swing motor 49 coincides with the neutral segment between the acceleration and deceleration segments. If the swing speed is above the threshold speed, the controller 100 may then prevent a destroking of the pump 58 during the neutral and early deceleration segments and maintain an upstroked position of the pump 58 despite the actuation of the swing lever to the non-actuating level. Destroked and upstroked positions may refer to a low displacement and a high displacement, respectively, of the pump 58. Alternatively, the controller 100 may control a pump flow as required in order to prevent any voiding of the swing motor 49.

As shown in FIG. 4, a third portion 322 of the curve 308 may indicate the pump flow. The pump flow may be decreased during the deceleration segment in order to decelerate the swing motor 49. Further, during most of the deceleration segment, the first accumulator 108 is charged, as indicated by the curve 306. Moreover, the charging may be stopped before the end of the deceleration segment depending on the pressure within the first accumulator 108 and the speed of swing.

Referring to FIG. 5, if the controller 100 determines that the return flow is sufficient to prevent voiding of the swing motor 49, the controller 100 may destroke the pump 58 following the actuation of the swing lever to the non-actuating level. Further, the controller 100 may upstroke the pump 58 during the deceleration segment if the controller 100 determines that the return flow is insufficient to prevent voiding of the swing motor 49. Destroking and subsequent upstroking of the pump 58 may be indicated by a destroking curve 324 and a upstroking curve 326, respectively. A time lag may be observed during destroking of the pump 58 as the destroking curve 324 may be curvilinear and not a vertical line. A similar time lag may be observed during upstroking of the pump 58. The time lags may be due to a slow pump response. The makeup flow due to the time lags may be provided by the return flow from the return line 53 and/or the second accumulator 110. Further, a shaded region 328 between the destroking and upstroking curves 324, 326, and the third portion 322 may represent an extent of makeup flow from the return line 53 and/or the second accumulator 110.

INDUSTRIAL APPLICABILITY

The disclosed hydraulic control system may be applicable to any excavation or other work-performing machine that performs a substantially repetitive work cycle, which involves swinging movements of a work tool. The machine may be a hydraulic excavator, a backhoe, a front shovel, a dragline excavator, or another similar machine. The disclosed hydraulic control system includes a swing motor configured to move a part of the machine. A first accumulator may selectively charge or discharge based on an operation of the swing motor.

Referring to FIGS. 1 and 2, the hydraulic control system 50 includes the swing motor 49 responsible for the swinging motion of the work tool 16 of the machine 10. The pump 58 is configured to selectively supply pressurized fluid to the swing motor 49. The first accumulator 108 is charged or discharged based on an operation of the swing motor 49. During the charging of the first accumulator 108 by the swing motor 49, it may be possible for the swing motor 49 to receive too little fluid from the pump 58 and, unless otherwise accounted for, the insufficient supply of fluid from the pump 58 to the swing motor 49 under these conditions could cause the swing motor 49 to cavitate. A return flow from the second circuit 54 and/or the second accumulator 110 may be provided as makeup flow to the swing motor 49 to prevent cavitation. However, the second accumulator 110 may be an additional component that increases a cost, design complexity, and/or maintenance requirements of the hydraulic control system 50. Further, an availability of the return flow from the second circuit 54 may not be guaranteed in certain operating conditions, such as in the case of swing single function operation . . . .

Figure 6:
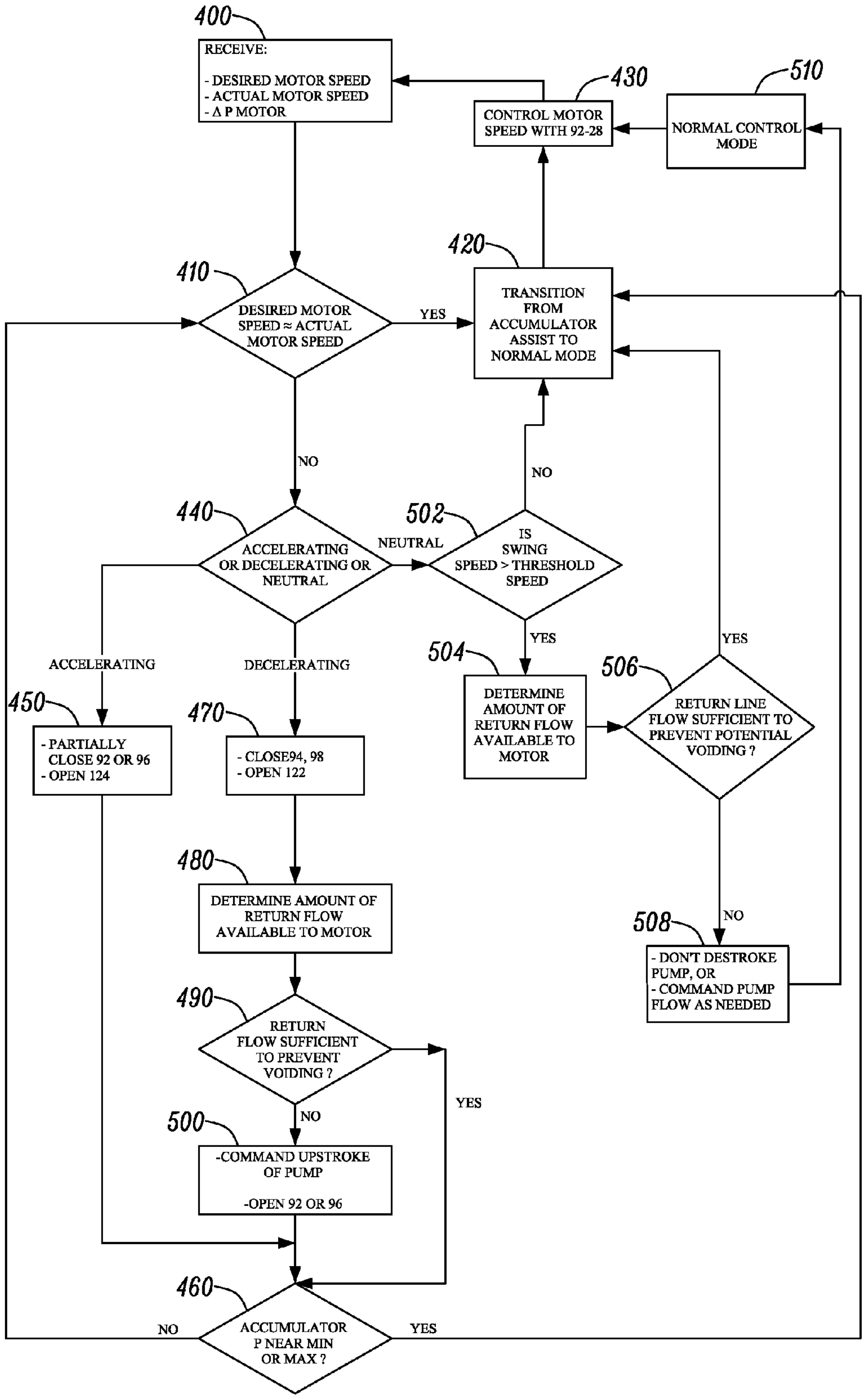
FIG. 6 is a flowchart depicting an exemplary disclosed method that may be performed by the hydraulic control system of FIG. 2.

FIG. 6 illustrates an exemplary method used by the controller 100. FIG. 6 will be discussed in more detail below to further illustrate the disclosed concepts. As seen in the flowchart of FIG. 6, the controller 100 may receive input indicative of a desired speed of the swing motor 49, an actual speed of the swing motor 49, and a pressure gradient across the swing motor 49 (Step 400). The input indicative of the desired speed may be a signal generated by the operator input device 48, while the input indicative of the actual speed may be a signal generated by the performance sensor 141 associated with the swing motor 49. The input indicative of the pressure gradient across the swing motor 49 may include signals generated by the pressure sensors 102. It is contemplated that other input indicative of the desired speed, actual speed, and/or pressure gradient of the swing motor 49 may also or alternatively be utilized, if desired.

The controller 100 may then determine if the desired speed is about equal to (i.e., within a threshold amount of) the actual speed (Step 410). In the disclosed embodiment, the pressure gradient across the swing motor 49 may be directly related to a difference between the desired and actual speeds of the swing motor 49. In particular, when the pressure gradient is large, the swing motor 49 may either be undergoing a significant acceleration or a significant deceleration (depending on the sign or direction of the pressure gradient), which corresponds with a significant difference between the desired and actual speeds of the swing motor 49. In contrast, when the pressure gradient is less than a threshold amount, the swing motor 49 may not be significantly accelerating or decelerating and the difference between the desired and actual speeds is accordingly small. Alternatively, the signals from the sensors 102 and 141 may be utilized to determine the difference between the desired and actual speeds.

When the difference between the desired speed and the actual speed is small (e.g., equal to or less than a low threshold amount), the controller 100 may conclude that use of the first accumulator 108 is unwarranted (i.e., that charging or discharging of the first accumulator 108 would either not be possible or would be inefficient) and follow the normal mode of swing operation using pump pressure to move the work tool 16 (Step 420). In the normal mode of operation, the controller 100 may utilize the drain and supply elements 92-98 in a conventional manner to regulate flows of fluid from the pump 58 to the swing motor 49 and from the swing motor 49 to the tank 60 (Step 430). If already using the first accumulator 108 to move the work tool 16, the controller 100 may transition to the normal mode of operation in step 420.

When the difference between the desired speed and the actual speed is large (e.g., more than the low threshold amount), the controller 100 may determine whether the swing motor 49 is accelerating or decelerating (Step 440). The controller 100 may determine whether the swing motor 49 is accelerating or decelerating based on the pressure gradient across the swing motor 49, the desired speed of the swing motor 49, and the actual speed of the swing motor 49. For example, when the desired speed is in the same direction as and larger than the actual speed, and the pressure gradient across the swing motor 49 is large, the controller 100 may conclude that the swing motor 49 is accelerating (then to step 450). In contrast, when the desired speed is in the same direction as and less than the actual speed (or in a direction opposing the actual speed), and the pressure gradient is large, the controller 100 may conclude that the swing motor 49 is decelerating (then to step 470). It is contemplated that the controller 100 could alternatively utilize a direction of the pressure gradient to make the above determinations rather than the relative directions of the desired and actual speeds, if desired. Determination and/or confirmation of whether the swing motor 49 is accelerating or decelerating may also be performed by comparing actual speeds of the swing motor 49 at successive points in time, and calculating the change of speed per time elapsed.

When the controller 100 determines that the swing motor 49 is accelerating, the controller 100 may utilize pressurized fluid stored within the first accumulator 108 to assist the movement of the work tool 16. In particular, the controller 100 may at least partially close the appropriate one of the first and second chamber supply elements 92, 96 (depending on the desired rotational direction of the swing motor 49) to inhibit fluid flow from the pump 58 to the swing motor 49, and simultaneously open the discharge valve 124 to supply fluid from the first accumulator 108 to the swing motor 49 (Step 450). It should be noted that the closing of the first or second chamber supply elements 92, 96 may be coordinated with the opening of the discharge valve 124, such that a gradual reduction in flow provided by the pump 58 may be accommodated by a corresponding gradual increase in flow provided by the first accumulator 108. In this manner, the motion of the swing motor 49 may be continuous and substantially unaffected by the switch between supply sources.

While supplying fluid from the first accumulator 108 to the swing motor 49, the controller 100 may monitor the pressure of fluid within the first accumulator 108 and compare the monitored pressure to a one or more pressure thresholds (e.g., to a minimum pressure threshold during acceleration) (Step 460). If the pressure of fluid within the first accumulator 108 passes through the appropriate pressure threshold (e.g., when the pressure of the fluid within the first accumulator 108 reaches or falls below the minimum pressure threshold during acceleration), control may return to step 420 where operation will transition to the normal mode. In this situation, the capacity of the first accumulator 108 to provide fluid will have been nearly or completely exhausted, and the pump 58 should be used to continue the swinging motion of the work tool 16. Otherwise, control may loop back to step 410.

If at step 440, the controller 100 instead determines that the swing motor 49 is decelerating, the controller 100 may use the first accumulator 108 to slow the work tool 16 and to simultaneously capture otherwise wasted energy in the form of stored pressurized fluid. In particular, the controller 100 may at least partially close the appropriate one of the first and second chamber drain elements 94, 98 (depending on the desired rotational direction of the swing motor 49) to inhibit fluid flow from the swing motor 49 being directed into the tank 60, and simultaneously open the charge valve 122 to instead direct the pressurized fluid from the swing motor 49 into the first accumulator 108 for storage (Step 470). As the fluid enters the first accumulator 108, the pressure within the first accumulator 108 and in the passages leading back to the swing motor 49 may increase, thereby providing greater resistance to the rotation of the swing motor 49 and slowing the swing motor 49. It should be noted that the gradual closing of the first or second chamber drain elements 94, 98 may be coordinated with the gradual opening of the charge valve 122, such that the reduction in flow to the tank 60 may be accommodated by the increase in flow into the first accumulator 108. In this manner, the motion of the swing motor 49 may be continuous and substantially unaffected by the change in collection reservoirs.

During deceleration, because substantially all of the return flow of fluid from the swing motor 49 may be directed into the first accumulator 108, as opposed to being routed back to the low-pressure passage 78 (through the relief valves 76) and/or the drain passage 88 (through 94, 98) from where the flow could reach the opposite side of the swing motor 49 (through the check valves 74 and/or the makeup valves 99), the displacement of the pump 58 may naturally destroke since no flow is requested from the first and/or second circuit 52 and 54. In this situation, it may be possible for the swing motor 49 to be starved of makeup fluid and, if not accounted for, the swing motor 49 could be caused to cavitate during charging of the first accumulator 108. Accordingly, the controller 100 may be configured to determine an amount of return flow available to the swing motor 49 during a deceleration event (Step 480). In particular, the controller 100 may monitor the activities of other actuators of the machine 10 (e.g., the activities of actuators in the second circuit 54) and/or monitor the flow rate of fluid returning from the second circuit 54 back into the first circuit 52. The controller 100 may then compare the flow rate of return fluid from the second circuit 54 to an amount of makeup fluid required by the swing motor 49 to prevent voiding or cavitation (Step 490). When the amount of return fluid from the second circuit 54 is insufficient to prevent cavitation of the swing motor 49, the controller 100 may command the pump 58 to increase its displacement (i.e., to upstroke) and command the appropriate one of the first or second chamber supply elements 92, 96 to open and provide additional makeup fluid to the swing motor 49 (Step 500). Control may pass then from steps 490 and 500 to step 460.

While directing fluid into the first accumulator 108 from the swing motor 49 during deceleration, the controller 100 may monitor the pressure of fluid within the first accumulator 108 and compare the monitored pressure to one or more pressure thresholds (e.g., to a maximum pressure threshold during deceleration) (Step 460). If the pressure of fluid within the first accumulator 108 passes through the appropriate pressure threshold (e.g., when the pressure of the fluid within the first accumulator 108 reaches or exceeds the maximum pressure threshold during deceleration), control may return to step 420 where operation will transition to the normal mode. In this situation, the capacity of the first accumulator 108 to receive fluid will have been nearly or completely exhausted, and the tank 60 should be used to consume the return fluid and continue the swinging motion of the work tool 16. Otherwise, control may loop back to step 410.

If at step 440, the controller 100 determines that the swing motor 49 is operating in the neutral segment (neither accelerating or decelerating), the controller 100 may then compare a swing speed of the work tool 16 with the threshold speed at step 502. The threshold speed may be a low speed (E.g., about 2 rpm) which may coincide with a substantially zero speed during most of the dump or dig segments. In case, the swing speed is below the threshold speed, control may return to step 420 where operation will transition to the normal mode, as described above. In the normal mode, the pump 58 may be operated based on an actuation of the swing lever. Thus, step 502 may prevent a false potential voiding detection in case the swing speed is substantially zero. However, in case the swing speed is above the threshold speed, the controller 100 determines an amount of return flow in the return line 53 that is available as makeup flow to the swing motor 49 (step 504). In an embodiment, the return flow in the return line 53 may be provided by at least one of the second circuit 54 and the second accumulator 110. The second circuit 54 can include the hydraulic cylinders 28, 36 and 38. The hydraulic cylinders 28, 36 and 38 may be actuators of various components of the machine 10. However, in an alternative embodiment, when the second accumulator 110 is not present, the return flow may be provided by the second circuit 54 alone. The controller 100 then determines, at step 506, if the amount of return flow is sufficient to prevent a potential voiding of the swing motor 49 during the subsequent deceleration segment. Therefore, the controller 100 may be able to predict any potential voiding situation in the neutral segment before the start of the deceleration segment. The controller 100 may then proactive steps to prevent voiding in the deceleration segment as explained hereinafter.

In case, the amount of return flow is sufficient to prevent a potential voiding of the swing motor 49, control may return to step 420 where operation will transition to the normal mode. However, of the return flow is insufficient to prevent a potential voiding of the swing motor 49, the controller 100 may, at step 508, prevent a destroking of the pump 58 segment and maintain an upstroked position of the pump 58 despite an actuation of the swing lever to the non-actuating level. Any time lag (as shown in FIG. 5) in upstroking of the pump 58 may not adversely affect the operation of the swing motor 49 since the pump 58 is maintained at an upstroked position. Referring to the curve 308 in FIG. 5, the time lag during upstroking the pump 58 may be observed as the upstroking curve 326 may be curvilinear and not a vertical line. Referring to the curve 308 in FIG. 4, the time lag during upstroking the pump 58 is avoided as the pump 58 is maintained at an upstroked position. Alternatively, at step 508, the controller 100 may control a pump flow as required in order to prevent any voiding of the swing motor 49. Therefore, step 508 may obviate the necessity of the return flow to prevent voiding during deceleration of the swing motor 49, and relies solely on controlling the pump flow to provide sufficient flow to the swing motor 49. Consequently, the second accumulator 110 may be eliminated or have a reduced capacity. This may reduce a cost, a design complexity and/or maintenance requirements of the hydraulic control system 50. Further, any dependence of the return flow from the second circuit 54 may also be reduced. An availability of the return flow from the second circuit 54 may not be guaranteed when the second circuit 54 is not in operation. However, voiding of the swing motor 49 is prevented as the amount of return flow is checked in advance in step 506, and the pump flow solely used for preventing voiding of the swing motor 49 if required.

After step 508, control may continue to step 510 where the operation will continue in the normal mode where the pump flow is used for operating the swing motor 49. Subsequently, control loops back to steps 430 and 400.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:

a pump configured to pressurize a fluid;

a swing motor selectively driven by pressurized fluid from the pump, the swing motor configured to move a part of a machine; and a controller in communication with the pump, the controller being configured to:

receive an input indicative of a difference between a desired speed and an actual speed of the swing motor;

determine if the swing motor is accelerating, decelerating, or operating at a neutral mode based on the difference between the desired and actual speeds;

determine an amount of return fluid from an actuator of the machine that is available as makeup fluid for the swing motor if the swing motor is operating at constant speed;

receive an input indicative of a swing speed of the part of the machine; and control the pump based on at least the swing speed and the amount of return fluid.

2. The hydraulic control system of claim 1, wherein the swing motor is configured to operate at at least one of a constant speed and a low pressure differential during the neutral mode of operation.

3. The hydraulic control system of claim 2, wherein the controller is further configured to selectively cause the pump to at least maintain a displacement based on at least the swing speed and the amount of return fluid.

4. The hydraulic control system of claim 3, wherein the controller is further configured to selectively cause the pump to at least maintain a displacement during the neutral mode of operation of the swing motor if:

the swing speed is above a threshold speed; and the amount of return fluid is insufficient to prevent the swing motor from voiding during subsequent deceleration of the swing motor.

5. The hydraulic control system of claim 4, wherein controller is configured to operate the pump based on a displacement position of an operator input device during the neutral mode of operation of the swing motor if the swing speed is below the threshold speed.

6. The hydraulic control system of claim 1, wherein the input indicative of the difference between the desired speed and the actual speed comprises a first signal corresponding to a displacement position of an operator input device and a second signal generated by a speed sensor.

7. The hydraulic control system of claim 1, wherein the input indicative of the difference between the desired speed and the actual speed is a pressure differential across the swing motor.

8. The hydraulic control system of claim 7, wherein the controller is configured to determine that the swing motor is accelerating or decelerating when the pressure differential is greater than a threshold amount.

9. A machine comprising:

an implement system;

a hydraulic control system comprising:

an actuator configured to drive the implement system;

a pump configured to pressurize a fluid;

a swing motor selectively driven by pressurized fluid from the pump, the swing motor configured to move a part of a machine; and a controller in communication with the pump, the controller being configured to:

receive an input indicative of a difference between a desired speed and an actual speed of the swing motor;

determine if the swing motor is accelerating, decelerating, or operating at a neutral mode based on the difference between the desired and actual speeds;

determine an amount of return fluid from the actuator of the machine that is available as makeup fluid for the swing motor if the swing motor is operating at the neutral mode;

receive an input indicative of a swing speed of the part of the machine; and control the pump based on at least the swing speed and the amount of return fluid.

10. The machine of claim 9, wherein the swing motor is configured to operate at at least one of a constant speed and a low pressure differential during the neutral mode of operation.

11. The machine of claim 10, wherein the controller is further configured to selectively cause the pump to at least maintain a displacement based on at least the swing speed and the amount of return fluid.

12. The machine of claim 11, wherein the controller is further configured to selectively cause the pump to at least maintain a displacement during the neutral mode of operation of the swing motor if:

the swing speed is above a threshold speed; and the amount of return fluid is insufficient to prevent the swing motor from voiding during subsequent deceleration of the swing motor.

13. The machine of claim 12, wherein controller is configured to operate the pump based on a displacement position of an operator input device during the neutral mode of operation of the swing motor if the swing speed is below the threshold speed.

14. The machine of claim 9, wherein the input indicative of the difference between the desired speed and the actual speed comprises a first signal corresponding to a displacement position of an operator input device and a second signal generated by a speed sensor.

15. The machine of claim 9, wherein the input indicative of the difference between the desired speed and the actual speed is a pressure differential across the swing motor.

16. A method of operating a hydraulic control system, comprising:

pressurizing a fluid with a pump;

selectively directing the pressurized fluid from the pump to a swing motor to move a part of a machine;

receiving an input indicative of a difference between a desired speed and an actual speed of the swing motor;

determining if the swing motor is accelerating, decelerating, or operating at a neutral mode based on the difference between the desired and actual speeds; and determining an amount of return fluid from an actuator of the machine that is available as makeup fluid for the swing motor if the swing motor is operating at the neutral mode;

receiving an input indicative of a swing speed of the part of the machine; and controlling the pump based on at least the swing speed and the amount of return fluid.

17. The method of claim 16, wherein the swing motor is configured to operate at at least one of a constant speed and a low pressure differential during the neutral mode of operation.

18. The method of claim 17, wherein controlling the pump comprises selectively causing the pump to at least maintain a displacement based on at least the swing speed and the amount of return fluid.

19. The method of claim 18, wherein controlling the pump further comprises selectively causing the pump to at least maintain a displacement during the neutral mode of operation of the swing motor if:

the swing speed is above a threshold speed; and the amount of return fluid is insufficient to prevent the swing motor from voiding during subsequent deceleration of the swing motor.

20. The method of claim 19, wherein controlling the pump further comprises operating the pump based on a displacement position of an operator input device during the neutral mode of operation of the swing motor if the swing speed is below the threshold speed.

* * * * *